April 13, 1965   R. D. QUILLIAN, JR   3,177,861
INTERNAL COMBUSTION ENGINE
Filed July 29, 1963   3 Sheets-Sheet 1

Roy D. Quillian, Jr.
INVENTOR.

BY
ATTORNEYS

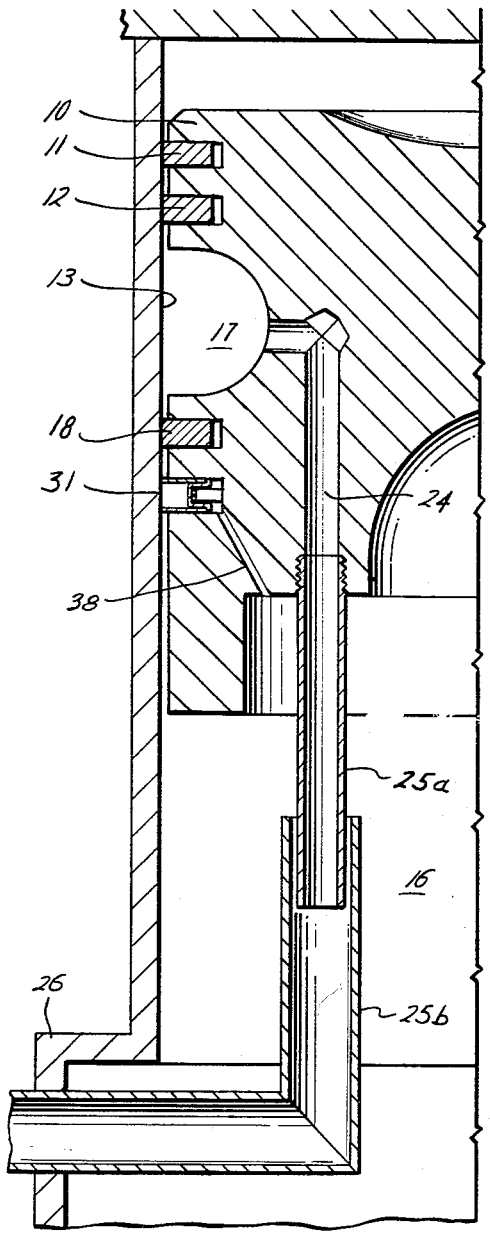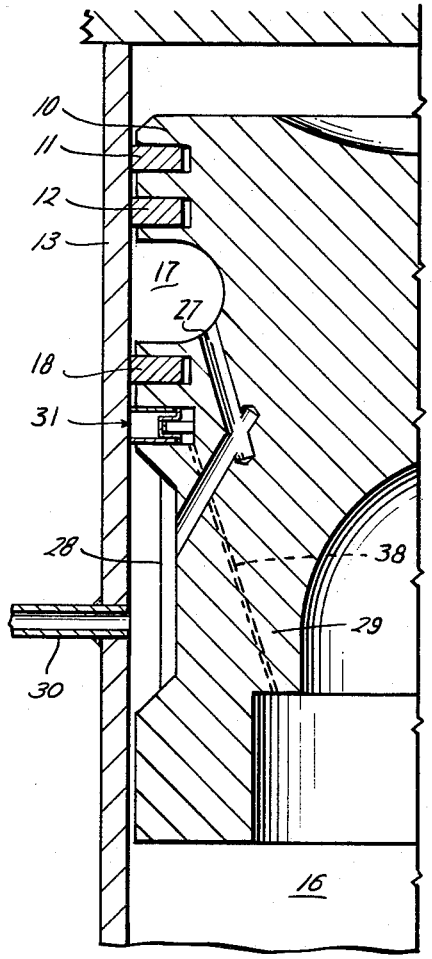

United States Patent Office

3,177,861
Patented Apr. 13, 1965

3,177,861
INTERNAL COMBUSTION ENGINE
Roy D. Quillian, Jr., San Antonio, Tex., assignor to Southwest Research Institute, San Antonio, Tex.
Filed July 29, 1963, Ser. No. 298,069
4 Claims. (Cl. 123—193)

This invention relates to internal combustion engines and, more particularly, to a method and apparatus for reducing the amount of combustion products which enter the crankcase of an internal combustion engine.

In an internal combustion engine, power is obtained by burning a mixture of fuel and air in a combustion chamber to produce high pressure gases which force a piston to move in a cylinder. To obtain the maximum benefit from the high pressure gases thus produced, the gases should be retained in the combustion chamber where they can exert the maximum amount of force on the piston. Therefore, seal means are usually employed to provide a moving seal between the piston and the cylinder to reduce the amount of the products of combustion which escape past the piston.

This moving seal can be obtained in many ways. For example, in some engines (usually small engine such as those used in model airplanes) an adequate seal is obtained by simply providing a relatively small clearance between the piston and the cylinder. In a large majority of internal combustion engines, however, the moving seal is provided by compression rings carried by the piston. Usually none of these seals are perfect. In fact, they are not intended to be since generally the better the seal the higher the frictional drag the seals exert on the piston and the point is quickly reached where the power saved is more than offset by the additional work required to move the piston in the cylinder. Therefore, internal combustion engines usually experience some leakage of the fuel mixture and combustion products past each piston into the crankcase of the engine during the compression and combustion stroke of each piston. This leakage past the pistons is commonly referred to as "blow-by."

The effect of blow-by on engine power performance is not serious and amounts to only a small percentage of power loss. The effects of blow-by on engine longevity and service requirements, however, are significant as blow-by products usually contain acid, water, abrasives and other extraneous materials which contaminate the oil in the engine's crankcase and lubricating system. Thus, the life of the oil in the engine is reduced and it must be drained and replaced more frequently. Further, increased engine wear results from the carbonaceous and other abrasive materials which are carried into the crankcase by the blow-by products. In addition, certain combustion products which blow by the piston create sludge which, when it accumulates in sufficient amounts, restricts the flow of oil through the lubrication system.

Blow-by products may also contain amounts of unburned fuel, such as gasoline, which dilute the oil in the engine, reducing its viscosity and adversely affecting the lubricant's load-carrying ability. Further, blow-by products which are introduced into the crankcase of the engine and which are then expelled from the engine as crankcase vapors serve to increase the air pollution problems of metropolitan areas.

It is an object of this invention to provide methods and apparatus for reducing the amount of blow-by products which enter the crankcase of an internal combustion engine.

It is another object of this invention to provide apparatus for so reducing the amount of blow-by products which enter the crankcase of an internal combustion engine which is economical to install in the engine and which does not affect the power output of the engine.

It is an additional object of this invention to provide a novel piston for internal combustion engines which will greatly reduce the amount of blow-by products which enter the crankcase of the engine.

It is an additional object of this invention to provide methods for reducing the amount of blow-by products which enter the crankcase which require the modification of only the piston of the engine.

It is also an object of this invention to provide method and apparatus for reducing the amount of blow-by products which enter the crankcase of an internal combustion engine wherein the blow-by products are returned to the combustion chamber, either directly or through the air intake manifold, thereby reducing air pollution as well as contamination of the lubricating oil in the engine crankcase.

Other objects, features and advantages of this invention will be apparent to those skilled in the art from a consideration of the specification, drawings and appended claims.

In accordance with this invention, the blow-by products are collected prior to reaching the crankcase of the engine and discharged to a point remote from the crankcase. That is, as oppoesd to prior attempts to solve the problem, the method and apparatus contemplated by this invention makes no attempt to reduce the amount of blow-by past the compression rings of the pistons. To the contrary, such apparatus includes a means to divert the blow-by products after they pass the compression seal between the piston and the cylinder and before they pass below the bottom of the piston into the crankcase, together with a chamber to collect the diverted products from which they can be discharged to a point remote from the crankcase. The remote point can be the combustion chamber from where they came or a point outside the cylinder or crankcase such as the intake manifold of the engine. The path followed by the products to reach these points can be either through the piston, back the way they came, through the cylinder walls, or through the walls of the crankcase itself.

In the drawings:

FIG. 5 is an alternate embodiment of the invention in which a conduit is provided to lead the blow-by products to a point outside the crankcase after they have been diverted and collected; and FIG. 6 is another embodiment of the invention wherein the cylinder wall as well as the piston are modified to allow the diverted and collected products to be discharged through the cylinder wall.

Figure 1:
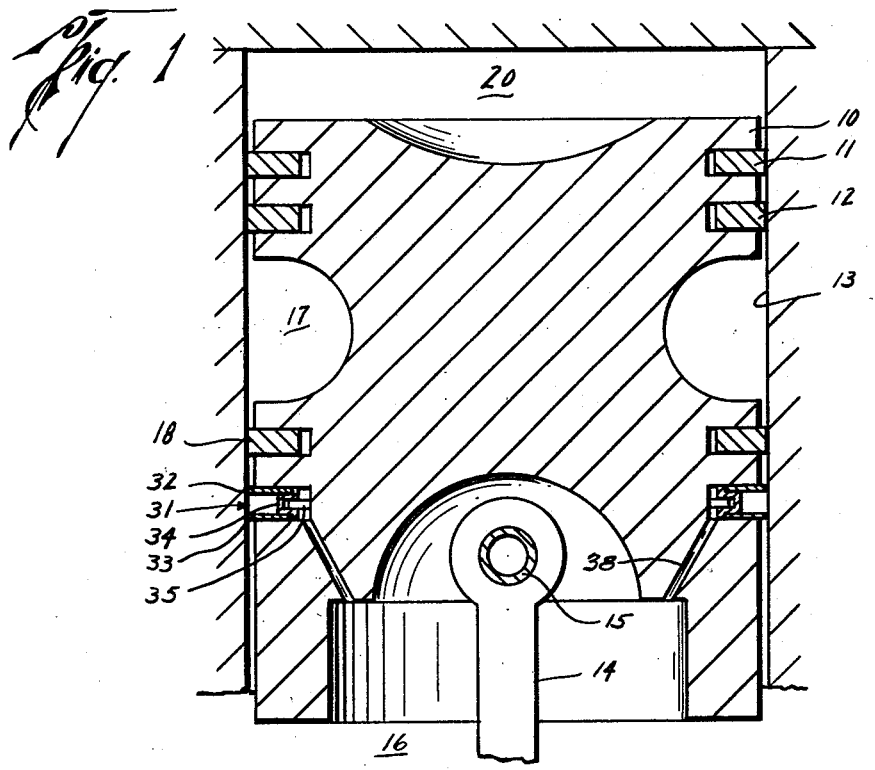
FIG. 1 is an embodiment of the invention whereby the blow-by produtcs are collected and returned to the combustion chamber along the same path they followed to escape.

In the embodiment shown in FIG. 1, a piston 10 equipped with two conventional compression rings 11 and 12 of rectangular cross section is arranged to reciprocate in cylinder 13 of an internal combustion engine. Compression rings are normally made of a heat resistant material such as cast iron, and they are usually split to allow the rings to be installed in the grooves provided therefor in the piston in the manner well known in the art.

Piston rod 14 has one end pivotally attached to the piston by means of wrist pin 15 and the other end (not shown) attached to the crankshaft of the engine. The crankshaft is in turn rotatably mounted in the crankcase of the engine which is located below the cylinder and piston, the portion of the crankcase shown in the drawings being indicated generally by the number 16.

In addition, piston 10 is also equipped with blow-by diverting means. In the embodiment illustrated, the diverting means consists of ring 18 which is of similar construction to compression rings 11 and 12 and which provides an additional moving seal between the piston and the cylinder below compression rings 11 and 12.

The upper end of cylinder 13 is closed by cylinder head 19 which combines with piston 10 to provide a combustion chamber 20 in the cylinder between the upper end of the piston and head 19. When the engine is running, a mixture of combustible gases is periodically introduced into this chamber through an inlet valve (not shown) and burned. The burning fuel produces gases which increase the pressure in the chamber, thus forcing the piston downwardly in the cylinder causing the piston rod to rotate the crankshaft. After the products of combustion have done their work, they are exhausted from the combustion chamber through an exhaust valve (not shown).

During the time the burning fuel in combustion chamber 20 is creating sufficient pressure to force the piston downward, a small percentage of the products of this combustion (which may also contain some unburned fuel) will escape past or blow by piston rings 11 and 12 and, if not prevented in some manner, enter crankcase 16 to contaminate the oil therein, pollute the atmosphere, etc. In the piston illustrated in FIG. 1, however, these blow-by products are diverted from the crankcase after they pass the compression rings and before they pass below the piston by means of seal ring 18. After being diverted, the products are collected in chamber 17 provided therefor on the piston where they are accumulated during the period that blow-by occurs.

Collection chamber 17, in the embodiment illustrated, is formed by an area of reduced piston diameter located between the compression rings and the seal ring. Preferably, the chamber should provide sufficient storage capacity for the blow-by products to prevent the pressure between the compression rings and the seal ring from exceeding the sealing capacity of the seal ring.

When the power stroke of the piston is completed and its associated exhaust valve opens, the pressure in combustion chamber 20 will drop to an amount equal to or less than the pressure in collection chamber 17 and blow by the compression rings into the collection chamber will stop. If at this point, the pressure in the combustion chamber drops below the pressure in the collection chamber, the blow-by products collected in the collection chamber will immediately begin to flow back past the compression rings into the combustion chamber. If the pressure doesn't drop in the combustion chamber sufficiently to cause the reversal of flow past the compression rings at this point in the cycle, it will drop sufficiently to do so when the piston enters its suction stroke which, of course, greatly reduces the pressure in the combustion chamber at which time the combustion products collected can be returned from the collection chamber to the combustion chamber.

Obviously, the rate of flow of the combustion products back past the compression rings into the combustion chamber is considerably less than the rate of flow of the products into the collection chamber during combustion due to the large differences in the pressure differentials causing the two rates of flow. However, even though the rates of flow into and out of the collection chamber are different, the length of time that each occurs are also different which allows most of the products collected during the compression and combustion portions of the stroke to return to the combustion chamber from the collection chamber even though they return at a slower rate.

This time difference results because in the average internal combustion engine the crankshaft travels through 720° of rotation between events in the cycle. Compression and combustion normally occur during an average of 100° of rotation. Thus, the products of combustion are being collected during about one-seventh of the cycle while the products collected have about six times as long to flow back to the combustion chamber. This provides the time difference discussed above which offsets the difference in flow rates of the blow-by products past the compression rings into and out of the collection chamber.

Thus in the embodiment shown in FIG. 1, during the compression and combustion portions of the cycle, the combustion products which blow by compression rings 10 and 11 are diverted by seal ring 18 and collected in collection chamber 17. As soon as the exhaust valve associated with the piston opens and the pressure in the combustion chamber drops sufficiently, the products collected in chamber 17 will be discharged back past compression rings 11 and 12 into the combustion chamber. By properly sizing the collection chamber in accordance with the ability of the seal ring 18 to divert the blow-by gases, the pressure in collection chamber 17 will oscillate between a maximum pressure and a minimum pressure as the piston goes through its cycles. As the compression rings wear, of course, the rate of blow-by will increase; however, by the same token the rate that the products collected in the chamber blow back past the compression rings will increase proportionately also, thereby offsetting the increase in the volume of products flowing past the compression rings during combustion.

Figure 2:
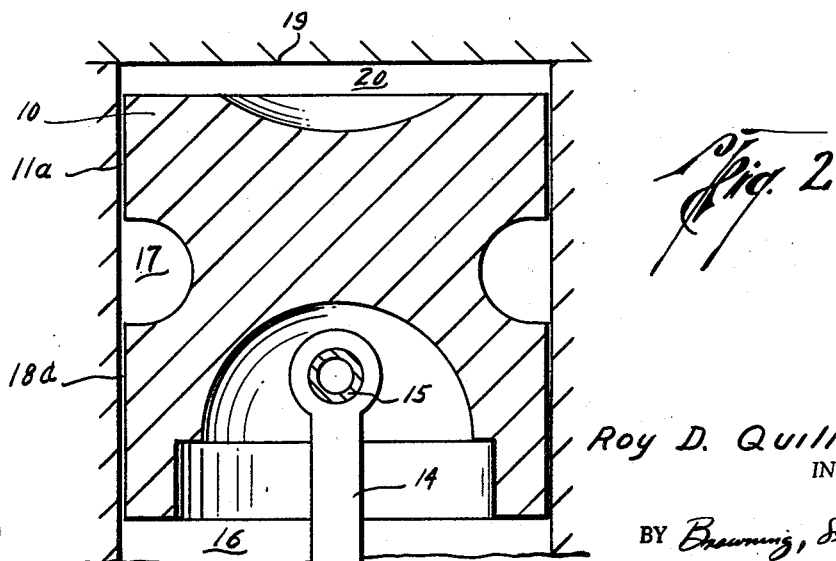
FIG. 2 is an embodiment of the invention which is similar to the embodiment shown in FIG. 1 except that the piston employs a fluid seal to maintain the products of combustion in the combustion chamber instead of compression rings.

FIG. 2 is an alternate embodiment of the invention which functions in the same manner as the embodiment of FIG. 1 with the exception that the piston in FIG. 2 is not provided with separate compression and seal rings as was the piston in FIG. 1. Instead, the products of combustion are maintained within combustion chamber 20 by providing a fluid seal between piston 10 and the walls of cylinder 173. This fluid seal is provided by maintaining the clearance between piston 10 and cylinder 13 very small so that the volume of combustion products which flows through the annular space between the piston and the cylinder during combustion does not appreciably affect the power output of the engine. Pistons of this type are usually found today in relatively small engines of the type similar to those used in model airplanes, etc.

Thus, in this embodiment we have a fluid seal 11a provided between piston 10 and cylinder 13 adjacent the upper end of the piston. Below this upper compression seal a collection chamber 17 is located which is similar to the one described above in connection with FIG. 2. Then below chamber 17 diverting means 18a in the form of a fluid seal similar to seal 11a above the collection chamber is provided.

In this embodiment then, a portion of the products of combustion during the compression and combustion cycles of the piston will leak past compression seal 11a between piston 10 and cylinder 13 and be diverted by seal 18a below collection chamber 17 and collected in chamber 17 in the same manner as described in connection with the embodiment in FIG. 1. Then, when the pressure in combustion chamber 20 drops with the opening of the exhaust valve or during the intake stroke of the piston, the combustion products collected in chamber 17 will be returned to combustion chamber 20 along the same path they took when they escaped from the combustion chamber initially.

Figure 3:
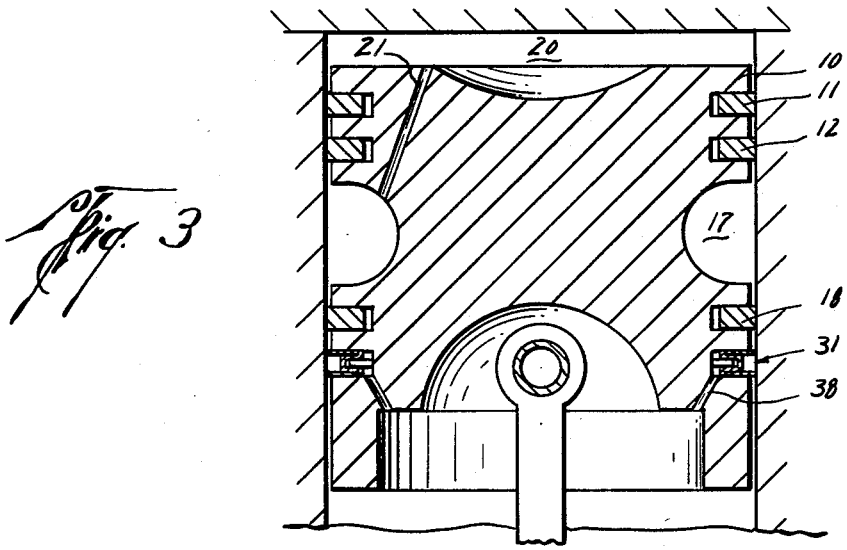
FIG. 3 illustrates an alternate embodiment of the invention whereby only the piston is modified and the blow-by products, after being diverted from entering the crankcase and collected, are returned to the combustion chamber of the engine through a passageway in the piston.
Figure 4:
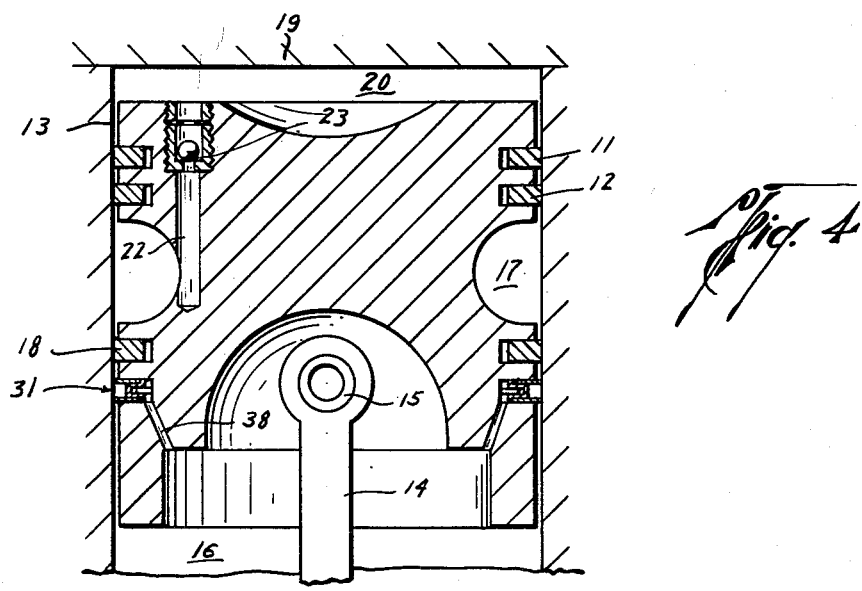
FIG. 4 is a similar embodiment to that shown in FIG. 5 differing only in the arrangement of the passageway through which the blow-by products return to the crankcase.

The alternate embodiments of the invention illustrated in FIGS. 3 and 4 are very similar and will be discussed together. In these embodiments, in addition to allowing the blow-by products to return back past the compression rings in the same manner as described above in connection with the embodiments shown in FIGS. 1 and 2, the pistons are provided with a passageway which leads through the piston from collection chamber 17 to the combustion chamber. Thus, in these embodiments the gases collected in the collection chamber during the compression and combustion portions of the cycle are returned to the combustion chamber through these passageways as well as back past compression rings 11 and 12.

In FIG. 3 the passageway, indicated by the number 21, must be very carefully sized. Obviously, there is no reason why the combustion products cannot flow into collection chamber 17 through passageway 21 as well as out of it. Therefore, the passageway must be sized such that the amount which can flow through the passageway during compression and combustion will not be sufficient to either affect the power output of the engine or increase the pressure in the collection chamber such that it will exceed the sealing ability of diverting ring 18. On the other hand, the size of the pasageway must be such that most of the products collected during blow-by will be returned to the combustion chamber during the time that the pressure in the combustion chamber is less than that in the collection chamber. The diameter of passageway 21 then must be determined by trial and error depending on the size of the piston, collection chamber, pressures involved, etc.

In the FIG. 4 embodiment, the size of passageway 22 is not so important since check valve 23 is located in the passageway to prevent the products of combustion from flowing from the combustion chamber into collection chamber 17. In this way the products collected in the collection chamber are free to flow back through passageway 22 to the combustion chamber as soon as the pressure drops sufficiently therein.

FIG. 5 illustrates yet another embodiment of the invention which differs from the previously described embodiments in that the piston is provided with a passageway 24 which leads from the collection chamber, not toward the upper end of piston 10 but down toward crankcase 16. Connected to the piston and forming an extension of passageway 24 is a short tubular member 25a which extends into the crankcase and telescopes within another tubular member 25b which passes through wall 26 of the crankcase. Thus, the blow-by products diverted by seal ring 18 and collected in collection chamber 17 of this embodiment are discharged from the collection chamber to a point remote from the crankcase by passing through tubular members 25a and 25b to the outside of the crankcase.

As shown, no seal is provided between the two tubular members to prevent the blow-by products from escaping from between the two members into the crankcase. It has been found that by maintaining the annular space between the two members at a minimum the tendency for the blow-by products to pass through the annular space into the crankcase is negligible. Further, by avoiding a seal at this point, the two tubular members can telescope as the piston moves up and down in the cylinder without creating any undesirable frictional drag on the moving piston. Also, if the end of the tube 25b which extends out of the crankcase is connected into the intake manifold of the engine, te pressure in the tube will be less than the pressure in the crankcase. This will create a flow of air from the crankcase into the annular space between the tubes which will, of course, prevent any of the blow-by products from escaping from the tubes. However, if desired, a seal can be used between the two tubes and in this way make sure that none of the diverted combustion products enter the crankcase.

In the embodiment of the invention illustrated in FIG. 6, the blow-by products collected are discharged through the cylinder wall to a point remote from the crankcase. This could be done by locating an opening in the cylinder so that it is directly opposite the collection chamber during the time that blow-by is occurring. However, with pistons which do not have a full skirt, it would be difficult to space the diverting ring far enough below the compression rings for the opening to be between the two throughout the complete stroke of the piston. It would be possible, of course, to locate the opening so that it is located between the compression rings and diverting ring during only a portion of the stroke during which blow-by occurs and thereby provides a means for discharging the blow-by products during at least a portion of the cycle. Whether such an arrangement could be used, of course, would depend on the size of the parts involved.

The embodiment illustrated is designed for use with pistons having only a partial skirt. However, it could be used as well with a full-skirted piston. It has a collection chamber 17 located between the compression rings and the seal ring and a passageway 27 which connects the collection chamber 17 to an elongated vertical slot 28 located on skirt 29 of the piston. Conduit 30 extends through the wall of the cylinder and is located opposite the slot 28. Thus, the blow-by products diverted by seal ring 18 and collected in collection chamber 17 of this embodiment are discharged from the collection chamber to a point remote from the crankcase by passing through passageway 27, into slot 28, and out through conduit 30.

Since with this type piston it is very difficult to locate a seal between the piston and the cylinder below slot 28, there may be a tendency for some of the combustion products to pass on downward into the crank case. However, this tendency is not great; and if conduit 30 is connected into the intake manifold of the engine to reduce the pressure in the conduit to less than atmospheric, air will flow upward past skirt 29 of the piston from the crankcase and carry most of the products of combustion with it into the conduit.

Seal ring 18, which is shown as being the diverting means used in all embodiments of the invention illustrated with the exception of the embodiment in FIG. 2, can consist of any device capable of providing a sliding seal between the piston and the cylinder. In some applications it may be advantageous to locate this ring on the cylinder rather than on the piston. Generally, the better the seal the more efficient the apparatus will be in preventing the products of combustion from entering the crankcase. However, the better the seal the higher the frictional drag will be between the seal and the cylinder wall. Therefore, here, as in the case of the compression rings, it is a compromise between frictional drag and sealing ability. The seal ring shown, which is one which has proven to be satisfactory, is simply a conventional cast iron ring like the ones used as compression rings 11 and 12.

Seal ring 18 can also act as a conventional oil seal and keep an excessive amount of oil from traveling up the walls of cylinder 13, or a separate oil seal can be provided in the manner shown in the drawings. Thus, in each embodiment illustrated, with the exception of the embodiment shown in FIG. 2, of course, which employs a fluid seal. Each piston is also provided with an oil-diverting ring 31 which serves to scrape the excess oil from the walls of the cylinder and return it to the crankcase, either back down the walls between the skirt of the piston and the cylinder wall, or through drain holes 38 which connect the groove in which the oil seal is located with the crank case. Oil seal 31 is conventional in that it has two spaced flat metal annular members 32 and 33 which are spaced apart by means of spacer 34 and held outwardly in engagement with the walls of cylinder 13 by means of a spring 35. This is best shown in FIG. 1.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An internal combustion engine comprising a crankcase, a cylinder opening into the crankcase, a piston reciprocable in the cylinder to form a combustion chamber, first seal means located between the piston and the cylinder to maintain most of the products of combustion in the combustion chamber, second seal means located between the piston and the cylinder on the opposite side of the first seal means from the combustion chamber to divert from the crankcase at least a portion of the products of combustion which blow-by the first seal means, said cylinder having an imperforate wall in that portion thereof bounded by said first and second seal means, and means including a collection chamber open to the clearance between the piston and cylinder between the first and second seal means but otherwise closed off from fluid communication with the crankcase and adapted to collect the diverted products of combustion and to combine with the second seal means in confining the products collected for return of at least a portion of them to the combustion chamber when the pressure of the products confined in the collection chamber exceeds the pressure in the combustion chamber, said collection chamber having sufficient storage capacity for the diverted products of combustion to prevent the pressure between the first and second seal means from exceeding the sealing capacity of the second seal means.

2. The engine of claim 1 wherein there is additionally provided a passageway leading from the collection chamber through the piston to the top thereof through which the collected products of combustion can return to the combustion chamber when the pressure in the collection chamber is higher than the pressure in the combustion chamber.

3. The engine of claim 2 wherein check valve means is located in said passageway to allow flow of combustion products from the collection chamber and to prevent flow of combustion products through the passageway to the collection chamber.

4. In an internal combustion engine having a crankcase, a cylinder with a closed end and another end opening into the crankcase, a piston reciprocally mounted in the cylinder to provide a combustion chamber between the piston and the closed end; and one or more compression rings carried by the piston to engage the cylinder and maintain the products of combustion in the combustion chamber; the improvement, in combination therewith, of a seal ring carried by the piston on the opposite side of the compression rings from the combustion chamber to thereby divert at least a portion of the products of combustion which escape from the combustion chamber past the compression rings; said cylinder having an imperforate wall portion which is exposed to the part of the piston between the compression and seal rings during the reciprocation of the piston; and means including a collection chamber open to the clearance between the piston and cylinder between the seal ring and the compression rings but otherwise closed off from fluid communication with the crankcase and adapted to collect the products diverted by the seal ring so that at least a portion of the collected products will return to the combustion chamber when the pressure thereof in the collection chamber exceeds the pressure in the combustion chamber, said colection chamber having sufficient storage capacity for the collected products to prevent the pressure between the compression and seal rings from exceeding the sealing capacity of the seal ring.

References Cited by the Examiner
UNITED STATES PATENTS

| | | | |
|---|---|---|---|
| 1,162,775 | 12/15 | Hesselman | 92—86 |
| 1,244,566 | 10/17 | White | 123—193 |
| 1,289,168 | 12/18 | Heginbottom | 92—86 |
| 1,803,387 | 5/31 | Flammang et al. | 92—227 |
| 1,850,474 | 3/32 | Peterson | 92—217 X |
| 1,998,277 | 4/35 | Flammang et al. | 92—211 |

FOREIGN PATENTS

| | | |
|---|---|---|
| 339,748 | 4/04 | France. |
| 367,866 | 9/06 | France. |
| 158,479 | 8/03 | Germany. |
| 233,728 | 5/25 | Great Britain. |

FRED E. ENGELTHALER, *Primary Examiner.*